United States Patent [19]
Fitzgerald

[11] Patent Number: 5,229,483
[45] Date of Patent: Jul. 20, 1993

[54] PHENOLIC STAIN-RESISTS

[75] Inventor: Patrick H. Fitzgerald, Pitman, N.J.

[73] Assignee: E. I. Du Pont de Nemours and Company, Wilmington, Del.

[21] Appl. No.: 878,405

[22] Filed: Apr. 30, 1992

[51] Int. Cl.$^5$ .................... C08G 8/04; C08G 75/00
[52] U.S. Cl. .................... 528/173; 528/129; 528/171
[58] Field of Search .................... 528/129, 171, 173

[56] References Cited

U.S. PATENT DOCUMENTS

| | | | |
|---|---|---|---|
| 4,410,675 | 10/1983 | Demmer | 525/533 |
| 4,501,591 | 2/1985 | Ucci et al. | 8/495 |
| 4,592,940 | 6/1986 | Blyth et al. | 428/96 |
| 4,680,212 | 7/1987 | Blyth et al. | 428/97 |
| 4,833,009 | 5/1989 | Marshall | 428/267 |
| 4,883,839 | 11/1989 | Fitzgerald et al. | 525/136 |
| 4,963,409 | 10/1990 | Liss et al. | 428/96 |
| 5,001,004 | 3/1991 | Fitzgerald et al. | 428/263 |
| 5,015,259 | 5/1991 | Moss, III et al. | 8/115.6 |

Primary Examiner—John Kight, III
Assistant Examiner—T. Mosley

[57] ABSTRACT

A stain-resist agent for polyamides fibers, its preparation and use are disclosed. The stain-resist agent is the condensation product of a phenolic of which at least 67 weight percent is bis-hydroxyphenylsulfone and the remainder p-cresol, p-phenolsulfonic acid or methyl-p-hydroxybenzoate, with from about 0.4 to 2.3 moles, per mole of the phenolic of a mercapto-substituted carboxylic acid selected from mercaptosuccinic acid, mercaptoacetic acid or mercaptopropionic acid; and about 1.4 to about 3.7 moles per mole of mercapto-substituted carboxylic acid of formaldehyde and sufficient base to neutralize all of the mercapto-substituted carboxylic acid groups and part but not all of the phenolic groups. The product contains about 3 to about 6 phenolic moieties with a molecular weight of 1500 to 2500 being preferred. Generally the reaction is carried out at reflux temperature (100° to 103° C.) for a period of 24 to 72 hours. Generally the stain-resist is applied to the polyamide fibers at a pH of 1.8 to 5.0 for a period of 1 to 60 minutes.

17 Claims, No Drawings

PHENOLIC STAIN-RESISTS

FIELD OF THE INVENTION

The present invention relates to novel compositions, useful as stain-resists for polyamide textile substrates, comprising water-soluble or water-dispersible base-catalyzed condensation polymers of bis-hydroxyphenylsulfone (BHPS), formaldehyde and a mercapto carboxylic acid; to processes for their preparation, and to polyamide substrates treated with said condensation products. The stain-resist agents of the present invention are more easily prepared, have improved lightfastness and color, and are more easily blendable with other stain-resists.

BACKGROUND OF THE INVENTION

Polyamide substrates, such as nylon carpeting, upholstery fabric and the like, are subject to staining by a variety of agents, e.g., foods and beverages. An especially troublesome staining agent is FD&C Red Dye No. 40, commonly found in soft drink preparations. Different types of treatments have been proposed to deal with staining problems. One approach is to apply a highly fluorinated polymer to the substrate. Another is to use a composition containing a sulfonated phenol-formaldehyde condensation product.

Examples of phenol-formaldehyde condensates are described in U.S. Pat. Nos. 4,501,591, 4,592,940, 4,680,212, 4,833,009. These materials are either condensation products of naphthalene monosulfonic acids with BHPS and formaldehyde or condensation products of phenolsulfonic acid with BHPS and formaldehyde. To impart stain resistance and solubility, the presence of sulfonic acid groups is necessary in these compounds, and the amount of sulfonation must be carefully controlled. These sulfonated condensates are themselves colored, often a deep brown, which can present a shade matching problem to the colorist.

Sulfonated phenol-formaldehyde condensation products are also subject to other undesirable color effects. Commonly they turn yellow on ageing after application to the fiber. Yellowing problems are described by W. H. Hemmpel in a Mar. 19, 1982 article in America's Textiles, entitled "Reversible Yellowing Not Finisher's Fault". Hemmpel attributes yellowing to exposure of a phenol-based finish to nitrogen oxides and/or ultraviolet radiation. To deal with the yellowing problem, the condensation products were modified by Liss et al in U.S. Pat. No. 4,963,409 and by Marshall in U.S. Pat. No. 4,833,009 to remove less active, highly sulfonated species. However, even after purification, yellowing remained a problem.

Moss III et al; in U.S. Pat. No. 5,015,259, disclose a stain-resist for polyamide fibers prepared by polymerizing an alpha-substituted acrylic acid or ester in the presence of a sulfonated aromatic formaldehyde condensation polymer. Fitzgerald et al., in U.S. Pat. No. 5,001,004, disclose the usefulness of aqueous solutions of hydrolyzed vinylaromatic/maleic anhydride copolymers in the treatment of textiles to render them resistant to staining. The preferred copolymer of Fitzgerald et al. is a hydrolyzed styrene/maleic anhydride copolymer. These compositions are effective against a variety of stains and do not tend to yellow significantly over time.

In U.S. patent application Ser. No. 07/626,885, filed Dec. 13, 1990, Pechhold discloses the utility of water-soluble or water-dispersible hydrolyzed maleic anhydride/alpha olefin polymers as stain-resist agents. And in U.S. patent application Ser. No. 07/634,794, filed Dec. 27, 1990, Pechhold discloses water-soluble or water-dispersible hydrolyzed maleic anhydride/vinyl ether or maleic anhydride/allyl ether polymers.

All of the polycarboxylate stain resists noted above function best when applied at low pH, and all suffer from a lack of fastness to an alkaline wash. Fitzgerald et al. (U.S. Pat. No. 4,883,839) describe the use of blends with sulfonated phenolic condensates to improve washfastness of the polycarboxylates.

The synthesis of monomeric carboxyalkylthiomethylated phenols has been described (Synthesis, April 1989, p 253 +ff), and carboxyalkylthiomethyl terminated polymers have been described (Demmer, U.S. Pat. No. 4,410,675), but none of these materials are stain resists.

SUMMARY OF THE INVENTION

The present invention relates to novel compositions, useful as stain-resists for polyamide textile substrates, comprising water-soluble or water-dispersible base-catalyzed condensation polymers of bis-hydroxyphenylsulfone (BHPS), or mixtures of BHPS with lesser amounts of other phenolic compounds, formaldehyde and a mercapto mono- or dicarboxylic acid, to processes for their synthesis and to polyamide substrates treated with said condensation products. The stain-resist agents of this invention are more easily prepared, have improved lightfastness and color, and are more easily blendable with other stain-resists at lower pHs, than some previously known materials.

DETAILED DESCRIPTION OF THE INVENTION

The present invention relates to the use of water-soluble or water-dispersible base-catalyzed condensation products of BHPS, formaldehyde and a mercapto carboxylic acid, as stain-resists for fibrous polyamides. BHPS and mixtures of BHPS with other phenolics have been found to be useful in the present invention. Other phenolics suitable for use with BHPS include p-cresol and p-phenolsulfonic acid. When mixtures are used, the BHPS content should be about 67% or higher. Formaldehyde is the only aldehyde suitable for use in this invention. Generally from about 1.4 to about 3.7 moles of formaldehyde per moles of mercapto substituted carboxylic acid is used. Mercapto acids suitable for use in this invention are mercaptosuccinic acid (MSA) which is most preferred, mercaptoacetic acid which is preferred and mercaptopropionic acid. Generally from 0.4 to 2.3 moles of mercapto acid are used per mole of phenolic. Alkalis suitable for the reaction are the alkali metal hydroxides including the hydroxides including sodium, potassium and lithium.

The condensation reaction is typically run in water at reflux, at an alkaline pH. Sufficient alkali is used to neutralize all of the mercapto acid and part, but not all, of the phenolic groups in the mass. Best rates are obtained when 0.6 moles per mole of BHPS, of alkali metal hydroxide is used in addition to that required to fully neutralize the mercapto acid. The reaction is typically run for 24 to 72 hours, preferably for 36 to 48 hours. Shorter reaction times can be obtained by driving the reaction with excess formaldehyde in those cases where the mercapto acid/BHPS ratio is in the higher range, say above about 1.3. Shorter reaction times can also be obtained by running the reaction at temperatures above 100° C. in a pressure vessel. However, higher temperatures often afford a product with a foul odor.

When the reaction has reached the desired level of completion, the mass is cooled and acidified with strong acid to precipitate the polymer. The supernatant liquid is then decanted to remove any unreacted formaldehyde and/or mercapto acid. After a water wash, the polymer is dissolved in dilute aqueous alkali metal hydroxide solution of dilute aqueous ammonium hydroxide. Clear solutions of these materials at 30% solids, or more, are readily obtained at neutral pH. When the amount of mercapto acid substitution is high, clear concentrates can readily be obtained at pH's of about 3 to 4.

The process also produced stain-resists when other phenolics, sulfonated and unsulfonated, are substituted for up to one-third of the BHPS, but these showed no advantage over BHPS alone. Included in these other phenolics are, for example, phenolsulfonic acid, p-cresol and methyl-p-hydroxybenzoate.

Mercaptoacetic acid and mercaptopropionic acid can be used in place of all or part of the MSA. These produced effective stain resists, but they are less soluble at low pH's, say below 3.5, and are therefore less effective as durabilizers for non-phenolic stain resists.

The preferred embodiments of the present invention are those polymers made with mercaptosuccinic acid (MSA) where the MSA/BHPS molar ratio used is between about 1.3 and 2 to 1 leading to products containing about 35 to 50% by weight of MSA moieties. They have molecular weights of about 1500 to 2500 by gel permeation chromatography and contain about 3 to 6 BHPS moieties. These are excellent stain resists on their own, and function well as durabilizers for non-phenolic resists.

The structures of the products of this invention have not been rigorously defined. It is envisioned that randonly linked di- and tetra-substituted BHPS moieties occur in the major components of the polymer and that the mercapto acid moieties appear at the ends of the molecules. For purposes of illustration, but not by way of limitation, the following simplified structure is offered:

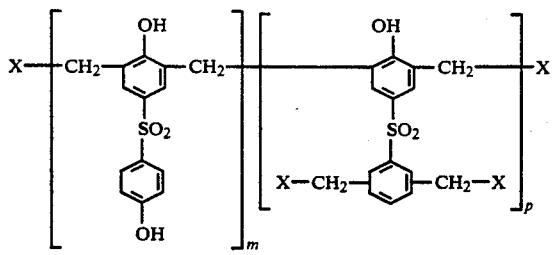

where
n=average number of bisphenolic moieties per molecule, and equals m+p,
p=zero to n, and
X=—S—R, a mercapto acid moiety.

The polymers of this invention can be used in treating polyamide textile substrates. They can be effectively applied by a wide variety of methods known to those skilled in the art, such as: padding, spraying, foaming in conjunction with foaming agents, batch exhaust in beck dyeing equipment, or continuous exhaust during a continuous dyeing operation.

They can be applied by such methods to dyed or undyed polyamide textile substrates. In addition, they can be applied to such substrates in the absence or presence of a polyfluoroorganic oil-, water-, and/or soil repellent materials. In the alternative, such a polyfluoroorganic material can be applied to the textile substrate before or after application of the polymers of this invention thereto.

The quantities of the condensates of this invention which are applied to the textile substrate, are amounts effective in imparting stain-resistance to the substrate. Those amounts can be varied widely; in general, one can use between 0.2 and 3% by weight of condensates based on the weight of the textile substrate, but usually 1.0% or less is used. Application at 0.5 to 0.8% on weight of fiber is preferred.

The condensates of this invention can be applied at pHs ranging between about 1.8 and 5.0. The least polar polymers, i.e., those with least mercapto substitution, performed better when applied at pHs above 3.0, but are effective at lower pHs when surfactant is added to provide low pH solubility in the application bath. Those with the most mercapto acid substituents, i.e., the more polar polymers, showed good low-pH solubility. These are most effective when applied at low pH, and these also gave excellent performance in blends with non-phenolic stain resists. More effective stainblocking is obtained if the condensates are applied to the textile substrate at either 15° to 35° C. and preferably about 20° C. followed by heat treatment at a temperature in the range between about 50° and 100° C. for about 1 to 60 minutes as in a typical continuous dyeing applicator, or applied at temperatures in the range between about 40° and 95° C. for about 1 to 60 minutes as in a typical Beck dyer. For example, at a pH between about 1.9 and 3.0, a temperature between about 70° and 90° C. is preferred. However, stain-blocking can be obtained when application is effected even at the temperature of a cold tap water, but the stain-resistance is less wash durable without heat treatment. The condensates of this invention are suitable for application with or without a magnesium salt.

The compositions of this invention can also be applied in-place to polyamide carpeting which has already been installed in a dwelling place, office or other locale. They can be applied as a simple aqueous preparation or in the form of an aqueous shampoo preparation, with or without one or more polyfluoro organic oil-, water-, and/or soil-repellent materials.

The following examples are given in further illustration of the invention but not by way of limitation.

EXAMPLE 1

(Molar ratios: 1 BHPS, 1.33 MSA, 2.83 CH$_2$O, 3.45 total NaOH, 0.79 -Acid NaOH)

To a 250 ml flask are added 45 g of water, 20 g, 80 mmol, of BHPS, 16 g, 106.7 mmol, of mercaptosuccinic acid, and 18.5 g, 228 mmol, of 37% aqueous formaldehyde solution. To this stirred mass was added 37 g, 277.5 nmol, of 30% aqueous sodium hydroxide solution which caused an exotherm from 24° C. to 52° C. The mass was heated to reflux over the course of an hour and held at reflux for 41.5 hours. A light amber solution results. The mass is allowed to cool to 70° C. It is acidified by the addition of 16 g of concentrated sulfuric acid in 40 g of water which caused an exotherm to 75° C. and the separation of a light yellow precipitate. The mass is stirred for 30 minutes at 70°–75° C. The agitation is stopped and the mass was allowed to separate. The top water layer is separated and discarded. The viscous bottom layer was washed twice with 50 g amounts of 0.5% sulfuric acid. The washed mass is dissolved by addition of 50 g of water and 13 g of 28% ammonium hydroxide solution. The product is a clear light amber solution which weighed 132 g and has a pH of 6. NMR analysis indicates that the BHPS is about 80% substituted at its four ortho positions.

Examples 2 through 6 are carried out in a manner similar to Example 1:

| Ex. No. | Moles per mole of BHPS | | | | Reaction Time at Reflux, hrs at 100-102° C. |
|---|---|---|---|---|---|
| | Mercapto Acid | $CH_2O$ | NaOH Total | (-Acid*) | |
| 2 | 0.67 MSA 0.67 MAA | 2.85 | 2.8 | (0.71) | 45 |
| 3 | 1.33 MSA | 3.08 | 3.5 | (0.84) | 24 |
| 4 | 1.0 MSA | 2.75 | 2.6 | (0.62) | 19 |
| 5 | 0.5 MSA | 1.25 | 1.4 | (0.37) | 23 |
| 6 | 1.9 MSA | 3.85 | 4.4 | (0.60) | 42 |
| 7 | 2.2 MSA | 3.85 | 5.0 | (0.60) | 42 |

*This column represents the amount of NaOH used in addition to the amount required to neutralize the mercapto acid.
MSA = mercaptosuccinic acid.
MAA = mercaptoacetic acid.

EVALUATION METHOD 1

Nylon fiber is treated with 1.2% stain-resist solution whose pH is adjusted to the desired value with either citric or sulfamic acids. The treatment was at a goods-to-liquor ratio of 1:32 for 45 minutes at 95° C. The fiber is then washed, air-dried at room temperature, and exposed to a dye solution consisting of 0.2 g FD&C Red Dye No. 40 and 3.2 g citric acid in 1 liter of distilled water at a goods-to-liquor ratio of 1:40. After approximately 65 hours, the dye adsorbed onto the fiber is determined at a wavelength of 498-502 nm by the comparing the absorbance remaining in solution with that of a control. Thus a number of 90 means 90% of the dye is adsorbed, indicating little stain resistance to the acid dye. The lower the number, the better is the resistance to stain. The following Table contains the results of this evaluation method when run on the various products whose preparations are described above.

| Ex. No. | Evaluation Method 1 Dye Absorbed pH | | | |
|---|---|---|---|---|
| | 2 | 3 | 4 | (2*) |
| 1 | — | 1 | — | — |
| 2 | 79 | 2 | 14 | — |
| 3 | 22 | 2 | — | 0 |
| 4 | 77 | 1 | 8 | — |
| 5 | 83 | 79 | 78 | — |
| 6 | 11 | 18 | — | 6 |
| 7 | 15 | 26 | — | 4 |
| (8) | 1 | 2 | 78 | — |

(2*) Treatment is at pH = 2, in presence of "Aerosol DPOS-45" surfactant, at 10% on weight of stain resist. (8) is a mixture comprised of 70% of a hydrolyzed sytrene/-maleic anhydride copolymer and 30% of a sample prepared in the same manner as No. 1.

EVALUATION METHOD 2

Some of the products, obtained as described above, are also applied to nylon carpet at 2.5% on weight of fiber in a simulated beck dyeing apparatus. The dried carpet is tested by saturating it with a solution of FD&C Red Dye No. 40 and letting it stand for 24 hours at ambient temperatures. It is rinsed with cold water and dried. The carpet is graded on a scale of 1 to 5 where 5 indicates no stain and 1 is equal to an untreated control.

| Ex. No. | Evaluation Method 2 Results pH | | | | |
|---|---|---|---|---|---|
| | 2.0 | 2.5 | 3.0 | 3.5 | 4.0 |
| 1 | — | 5 | — | — | — |
| 2 | — | — | 5 | 3 | — |
| 3 | — | — | 5 | — | — |
| 4 | 5 | 5 | — | — | 5 |
| 5 | 2 | — | — | — | 5 |
| (8) | 5 | 5 | — | — | — |

5 = Excellent stain resistance
4 = Very good
3 = Good
2 = Poor

I claim:

1. A stain-resistant agent for polyamide fibers, which is the condensation product of a phenolic consisting essentially of at least 67 weight percent bis-hydroxyphenylsulfone and the remainder—cresol, methyl-p-hydroxybenzoate, or p-phenolsulfonic acid; from about 0.4 and 2.3 moles per mole of the phenolic of a mercapto-substituted carboxylic acid selected from the group consisting of mercaptosuccinic acid, mercaptoacetic acid and mercaptopropionic acid; and about 1.4 to about 3.7 moles per mole of mercapto-substituted carboxylic acid of formaldehyde wherein all of the mercapto-substituted carboxylic acid groups and part, but not all, of the phenolic groups present are neutralized with base which condensation product contains from about 3 to about 6 phenolic moieties.

2. The anti-stain agent of claim 1 wherein the phenolic consists essentially of bis-hydroxyphenylsulfone.

3. The anti-stain agent of claim 2 wherein from 1.3 to 2 moles of mercapto-substituted carboxylic acid per mole of bis-hydroxyphenylsulfone are present.

4. The anti-stain agent of claim 3 wherein the mercapto-substituted carboxylic acid consists essentially of mercaptosuccinic acid.

5. The anti-stain agent of claim 4 wherein the base is lithium hydroxide, sodium hydroxide, or potassium hydroxide.

6. The anti-stain agent of claim 5 wherein the average molecular weight of the product is between about 1500 and about 2500 as determined by gel permeation chromotography.

7. A process comprising reacting a phenolic consisting essentially of at least 67 weight percent bis-hydroxyphenylsulfone and the remainder p-cresol, methyl-p-hydroxybenzoate, or p-phenolsulfonic acid; with from 0.4 to 2.3 moles, per mole of the phenolic, of a mercapto-substituted carboxylic acid selected from the group consisting of mercaptosuccinic acid, mercaptonacetic acid and mercaptopropiaonic acid, from about 1.4 to about 3.7 moles, per mole of mercapto-substituted carboxylic acid of formaldehyde and sufficient base to neutralize all of the mercapto-substituted carboxylic acid groups and part, but not all of the phenolic groups, at a temperature of 90° to 104° C. for from 24 to 72 hours.

8. The process of claim 6 wherein the phenoic consists essentially of bis-hydroxyphenylsulfone.

9. The process of claim 8 wherein there is present from 1.3 to 2 moles of mercapto-substituted carboxylic acid per mole of bis-hydroxyphenylsulfone.

10. The process of claim 9 wherein the mercapto-substituted carboxylic acid consists essentially of mercaptosuccinic acid.

11. The process of claim 10 wherein the base is selected from the hydroxides of lithium, sodium or potassium.

12. The process of claim 11 wherein the product contains from about 3 to about 6 phenolic moieties.

13. The process of claim 12 wherein the average molecular weight of the product is between about 1500 and 2500 as determined by gel permeation chromatography.

14. A process for rendering polyamide fibers stain resistant comprising applying the composition of claim 1 to such fibers.

15. The process of claim 14 wherein the composition is applied to the fiber from an aqueous bath for a period of 1 to 60 minutes, at a pH of 1.8 to 5.0.

16. The process of claim 15 wherein the composition is applied to the fiber at a temperature of 40° to 95° C.

17. The process of claim 15 wherein the composition is applied to the fiber at a temperature of 15° to 40° C. followed by a heat treatment of the treated fibers at 50° to 100° C. for 1 to 60 minutes.

* * * * *